(12) United States Patent
Andelman

(10) Patent No.: US 6,325,907 B1
(45) Date of Patent: Dec. 4, 2001

(54) ENERGY AND WEIGHT EFFICIENT FLOW-THROUGH CAPACITOR, SYSTEM AND METHOD

(76) Inventor: Marc D. Andelman, One Parkton Ave., Worcester, MA (US) 01605

( * ) Notice: Subject to any disclaimer, the term of this patent is extended or adjusted under 35 U.S.C. 154(b) by 0 days.

(21) Appl. No.: 09/691,013

(22) Filed: Oct. 18, 2000

Related U.S. Application Data

(60) Provisional application No. 60/159,983, filed on Oct. 18, 1999.

(51) Int. Cl.[7] .................................................... C02F 1/46
(52) U.S. Cl. ........................ 204/450; 204/554; 204/555; 204/600; 204/660; 204/661
(58) Field of Search ........................... 204/450, 600, 204/660, 554, 661, 555

(56) References Cited

U.S. PATENT DOCUMENTS

| | | |
|---|---|---|
| 3,658,674 | 4/1972 | Benak . |
| 5,192,432 | 3/1993 | Andelman . |
| 5,196,115 | 3/1993 | Andelman . |
| 5,200,068 | 4/1993 | Andelman . |
| 5,360,540 | 11/1994 | Andelman . |
| 5,415,768 | 5/1995 | Andelman . |
| 5,425,858 | 6/1995 | Farmer . |
| 5,538,611 | 7/1996 | Ottowa . |
| 5,547,581 | 8/1996 | Andelman . |
| 5,620,597 | 4/1997 | Andelman . |
| 5,748,437 | 5/1998 | Andelman . |
| 5,779,891 | 7/1998 | Andelman . |

*Primary Examiner*—Arun S. Phasge
(74) *Attorney, Agent, or Firm*—Leslie Meyer-Leon, Esq.; IP Legal Strategies Group P.C.

(57) ABSTRACT

An energy efficient flow-through capacitor, particularly for the concentration and/or separation of seawater. The flow-through capacitor is successively charged and discharged prior to the cell voltage exceeding 1.5 volts.

20 Claims, 11 Drawing Sheets

ENERGY AND WEIGHT EFFICIENT FLOW-THROUGH CAPACITOR, SYSTEM AND METHOD

REFERENCE TO PRIOR APPLICATION

This application is based on and claims the benefit of the priority date of U.S. provisional Patent Application Ser. No. 60/159,983, filed Oct. 18, 1999, hereby incorporated by reference.

GOVERNMENT CONTRACT

This invention was made under contract with the United States Defense, Advanced Research Projects Agency (DARPA), under Contract No. DAAD 19-99-C-0033. The United States Government may have certain rights in the invention.

BACKGROUND OF THE INVENTION

Flow-through capacitors have proven commercially useful for water purification and are well represented in the patent literature. For example, U.S. Pat. No. 3,658,674, issued Apr. 25, 1972; U.S. Pat. No. 5,192,432, issued Mar. 9, 1993; U.S. Pat. No. 5,196,115, issued Mar. 23, 1993; U.S. Pat. No. 5,200,068, issued Apr. 6, 1993; U.S. Pat. No. 5,360,540, issued Nov. 1, 1994; U.S. Pat. No. 5,415,768, issued May 16, 1995; U.S. Pat. No. 5,425,858, issued Jun. 20, 1995; U.S. Pat. No. 5,538,611, issued Jul. 23, 1996; U.S. Pat. No. 5,547,581, issued Aug. 20, 1996; U.S. Pat. No. 5,620,597, Apr. 15, 1997; U.S. Pat. No. 5,748,437, issued May 5, 1998; and U.S. Pat. No. 5,779,891, issued Jul. 14, 1998. The flow-through capacitors of the prior art become less energy efficient with increased solution concentration, and lose energy with concentrated solutions, including seawater. Therefore, the need exists for an improved flow-through capacitor with increased energy and weight efficiency, useful for purification concentrated solutions over 2000 ppm, including desalination of seawater, as well as more dilute solutions with increased energy efficiency.

SUMMARY OF THE INVENTION

The invention relates to a flow-through capacitor, system and method, particularly for energy efficient seawater desalination. Flow-through capacitors have a basic advantage over energy storage capacitors. The flow-through capacitor seeks to store charge, not energy. In order to store the most charge per unit time, the flow-through capacitor should be optimized for power characteristics, not energy storage. Power happens to be what capacitors are known to excel at, not energy storage. For most efficient power, the flow-through apacitor should have a series resistance of 1 ohm or less.

In order to achieve low energy purification, it is necessary to take advantage of the fact that a capacitor is not a constant voltage device. The flow-through capacitor may be utilized at the low voltage part of its charging curve in order to achieve low energy purification. Optimal voltage during the charge cycle should not exceed 1 volt.

Kinetics

FIG. 1 shows a semilog graph of classic first order kinetics.

$$Z/Z_o = e^{-kt} \qquad (1)$$

and $$\text{Ln } Z/Z_o = -kt \qquad (2)$$

Where k is constant, Z equals solution concentration at time t, and $Z_o$ equals starting concentration. By equation (2), the semilog graph of FIG. (2) gives slope of constant −k and y intercept Ln $Z/Z_o$. First order kinetics have favorable scale up properties. Purification to a given percentage is only a function of starting concentration and time. This means that the same size equipment can be used across a broad range of concentrations. Equation (1) observed empirically, is of the exact same form as (3), below the equation for transient charging current of a capacitor. Equation (3) is true for a flow-through capacitor or any other kind of capacitor.

$$|/|_o = e^{-t/RC} \qquad (3)$$

where | equals current at any time, t and $|_o$ is the initial charging current, R is the series resistance, and C is capacitance. The initial current $|_o$ is simply ohm's law:

$$|=V/R \qquad (4)$$

where R is the resistance of the capacitor materials and leads. This is the maximum amount of current that you can put into the capacitor. You can also calculate the starting current based upon the capacitor size, resistance, and total charge on the capacitor (see (6) and (12) below).

In order to relate purification with amp and power requirements, it is required to relate equations (1) and (3).

$$Q=|t \qquad (5)$$

Where Q=charge, and F is Faradays constant, $9.648 \times 10^4$ coulombs/mole. Combining (4) ohms law with (5) we get Q/t=V/R at t=0. This means the charge rate at t=0 is inversely proportional to the resistance. Current, and therefore charge per unit time, according to (3) and (5), tapers off exponentially with time as the capacitor is charged.

It is desirable to purify a given amount of charge Q.

$$Q=CV=FZL \qquad (6)$$

where C equals capacitance, V equals final voltage that the capacitor is charged up to, | equals current, and t is in seconds, F is Faraday constant of $9.648 \times 10^4$ coulombs/mole, Z is moles/liter, and L=liters. Combining (6) with (5) shows that equations (1) and (3) are the same, and −k in (1) is therefore equal to −1/RC. This is an advantageous result because (1) was arrived at empirically for a flow-through capacitor. There is an implicit assumption in (6) that there is parity between electronic charge and ionic charge, which is discussed in the experimental section.

Energy Efficient Purification by Rapid Charge Cycling; the 1/n Charge Scheme.

Equation (6) shows that for small C, you cannot adsorb enough charge Q to desalt much seawater. However, if the capacitor is fast enough, i.e., has a high enough power rating, one can repeatedly charge/discharge a small weight efficient capacitor many times in order to get the same additive amount of Q.

In addition to weight efficiency, energy efficiency in watt hours/gallon is important for both dilute and concentrated ion, as well as seawater purification, so that small, including portable, power sources may be used. The energy to charge a capacitor is:

$$\text{Energy} = \tfrac{1}{2}CV^2 = \tfrac{1}{2}(1/C)Q^2 \text{(Joules)} \qquad (7)$$

Equation (7) shows that it costs more energy per coulomb of charge to put that charge into a capacitor as voltage increases. It also shows it costs more and more energy as each additional unit of charge is put into the capacitor. Happily, with the flow-through capacitor, we do not want to store energy. It is desired to adsorb charge Q, for the least amount of energy, or joules per coulomb. To ascertain how much power it takes to absorb a given amount of charge, divide (7) by (6):

$$\text{Joules/coulomb} = \tfrac{1}{2}CV^2/CV = \tfrac{1}{2}V \qquad (8)$$

The units are in volts, which makes sense because the definition of a volt is joules/coulomb. Here we are referring to an "ionic volt", as opposed to an electronic one. Equation (8) shows that the less voltage the capacitor is charged to, the less joules are required to store a given coulomb of charge, by a factor of ½.

A same amount of charge Q can be adsorbed by charging a capacitor n times at 1/n'th voltage, as can be adsorbed by charging the capacitor once to the fully charged voltage. This will require n times less energy. A smaller capacitor can also be used to store the same amount of charge at the same energy by charging a 1/n'th sized capacitor n more times. These cases are calculated as follows, for repeatedly charging and discharging a capacitor n times:

$$Q = CV = \sum_{i=1}^{i=n}\sum_{j=1}^{j=n} C_i V_j \qquad (9)$$

$$\text{Energy} = \frac{1}{2}\sum_{i=1}^{i=n}\sum_{j=1}^{j=n} C_i(V_j)^2 \quad \text{(Joules)} \qquad (10)$$

For our design $V_i = V/n$ fraction of full voltage V. In a case where $C_i$ is just a full sized capacitor C (10) becomes:

$$\text{Energy} = (1/2n)CV^2 \text{(Joules)} \qquad (11)$$

Dividing (11) by (6) above gives 1/n for the energy needed to adsorb a given amount of charge using the multiple charge strategy compared to charging all at once up to the full voltage. This only works as long as the time to adsorb an amount of charge (from the water) is less than the RC time constant to charge the capacitor, which is taken into account in the analysis below.

Transient Effects

All above discussion is for an ideal capacitor with no resistance. Real capacitors have series resistance.

Current at any time t is calculated from the resistance and capacitance.

$$I = I_o e^{-t/RC} \qquad (3)$$

The charge at any time t is the integral of (3)

$$Q = \int_{t=o}^{t} I_o e^{-t/RC} = I_o RC \left| \left( e^{-t/RC} - 1 \right) \right|_{t=o} \qquad (12)$$

for large RC, such as we are dealing with here, using ohms law (4), this reduces back to (6)

$$Q = I_o RC \qquad (6)$$

The energy needed to charge a non-ideal capacitor with resistance R is:

$$\text{Energy} = 1/2 CV_o^2 (1 - e^{(-t/RC)})^2 \text{(Joules)} \qquad (13)$$

for RC large, this reduces to equation (6)

$$\text{Energy} = \tfrac{1}{2} CV_o^2 \text{(Joules)} \qquad (7)$$

Capacitors in Series

Single cell flow-through capacitors usually require too many amps to be practical. In order to allow the use of light weight circuitry, the capacitors will have to be stacked in series. There is a fundamental difference in the design equation of a flow-through capacitor and a capacitor of the energy storage type. Capacitors of the energy storage type obey the following law when in series which greatly limits the amount of charge stored:

$$i=n$$
$$1/C_s = \Sigma 1/C_i \text{ and } Q_s = C_s V_s \qquad (14)$$

Equally sized flow-through capacitors in series obey the following law and are not limited by the smaller series capacitance in the amount of charge stored:

$$i=n$$
$$Q_s = \Sigma C_i V_i \qquad (15)$$
$$i-1$$

If (15) were not true, the charge storage ability of a series flow-through capacitor would be reduced by 1/n, where n is the number of cells in series. Flow-through capacitors in series should be built of series cells of as equal size as is possible to manufacture, because the voltage on capacitors in series divides such that the smallest capacitor has the highest voltage. Cells in series can also be individually monitored and controlled.

Practical Capacitor Device.

In practice, to achieve energy efficient operation, the individual capacitor cell should be run so that its voltage during the charge cycle averages less than 1.5 volts. Instead of charging a capacitor up to its rated voltage, for example 2 volts, the capacitor is discharged before its internal voltage has built up to 1.5 volts, preferably, less than 1 volt. Capacitors in series may, of course, be charged up to the multiple of the individual cell voltages, which may be higher than the above-mentioned voltages. However, the individual cell voltages need to be kept less than 1.5 volts in order to take advantage of the low energy purification. The less voltage the capacitor is charged to in a particular charge cycle, the less energy required to purify a given solution. For capacitors smaller than 100 Farads per gram per minute, dissolved ions flow purification mass flux rate with short cycles of 20 minutes or less and less than 1 volt is preferred. For high flow rate and light weight, the capacitor should be made from highly conductive materials. Electrodes with a resistance of less than 100 ohm cm are preferred.

Alternative Energy Saving Technique

In addition to the rapid charge cycling energy saving method, energy from a fully charged capacitor may also be recovered and used to help charge a discharged capacitor. For example, two capacitors may be run in parallel and used to help charge each other. Simply dumping the energy from two identically-charged capacitors will recover more than half the energy before voltage equalizes. DC to DC converters can theoretically be used to recover some of the remaining energy.

The invention will be described for the purpose of illustration only in connection with certain illustrated embodiments; however, it is recognized that various changes, modifications, additions, and improvements may be made in the illustrative embodiments without departing from the spirit or scope of the invention.

DESCRIPTION OF THE EMBODIMENTS

Experiment 1

A. 0.01 M NaCL solution was run through a capacitor containing 10 grams of activated carbon cloth, 1500 meters/gram BET, was purified at several voltages in order to demonstrate purification at energy saving low voltages.

Figure 1:
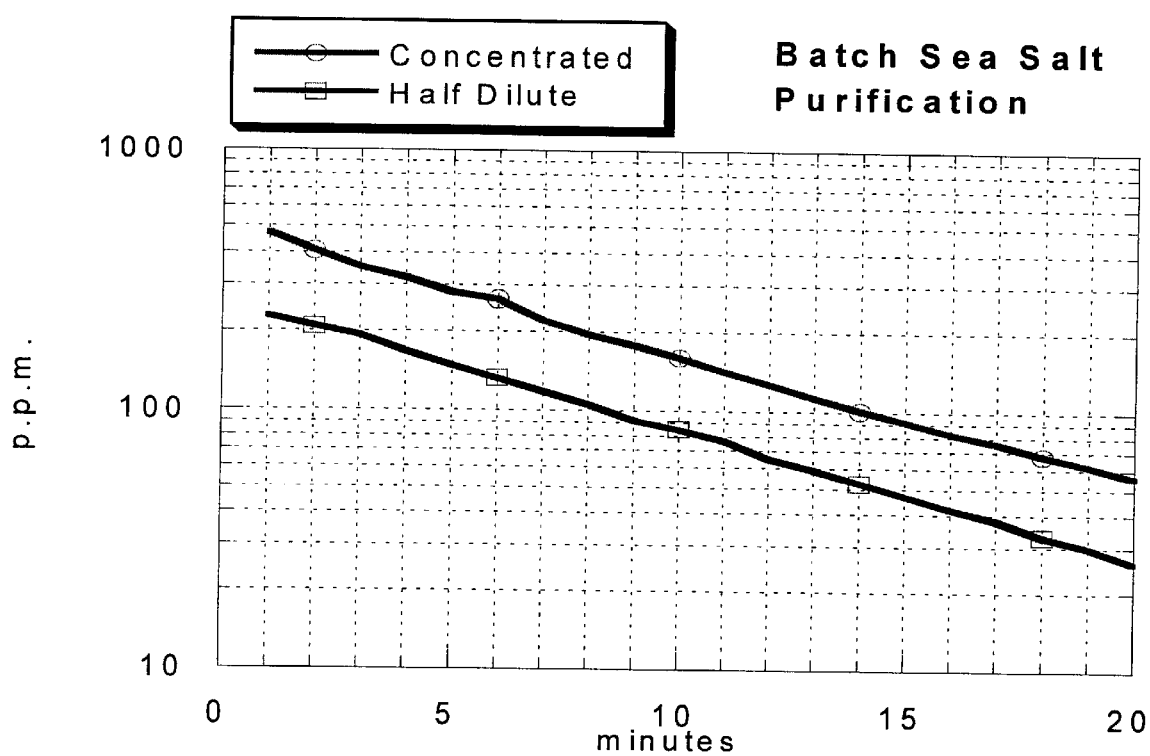
FIG. 1 is a semilog graphical representation of a first order kinetics.
Figure 2:
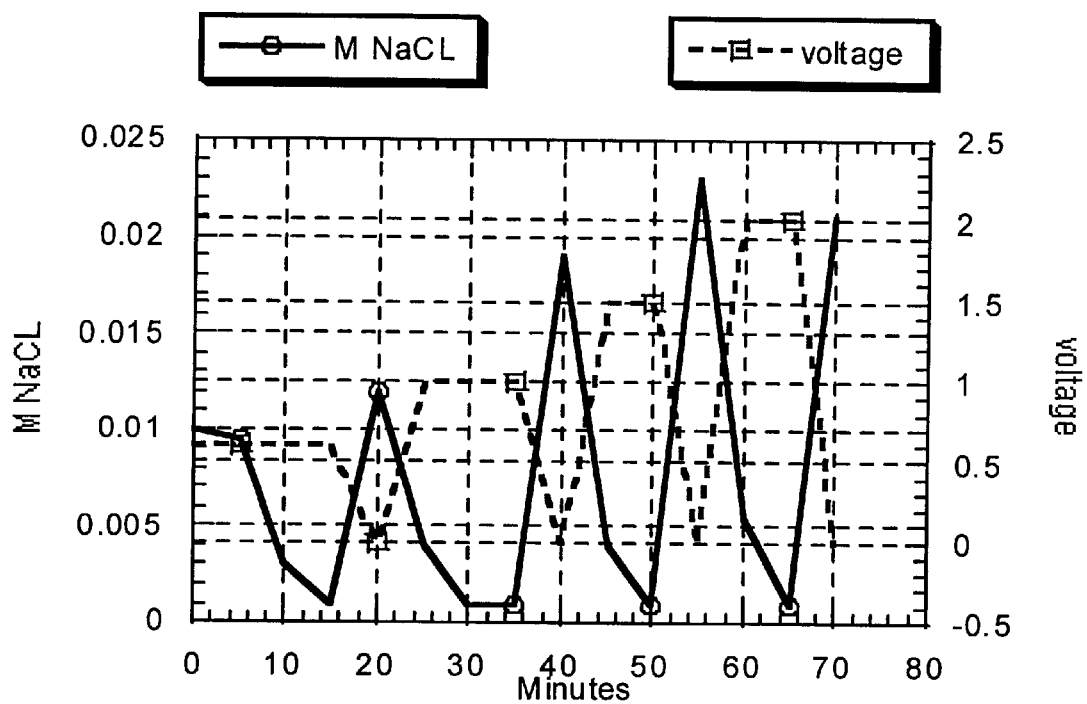
FIG. 2 is a graphical representation of the results of Experiment 1.

FIG. 2 demonstrates alternate and regeneration purification of a 0.01 M NaCL solution at 0.5, 1, 1.5, and 2 volts. During the regeneration phase, the capacitor was short circuited to 0 volts through a load.

Experiment 2

A commercial capacitor containing 1300 grams of 1500 square meters/gram carbon cloth was used to purify solutions at 500, 1000, and 2000 ppm in order to measure amp and energy efficiency versus voltage.

Figure 3:
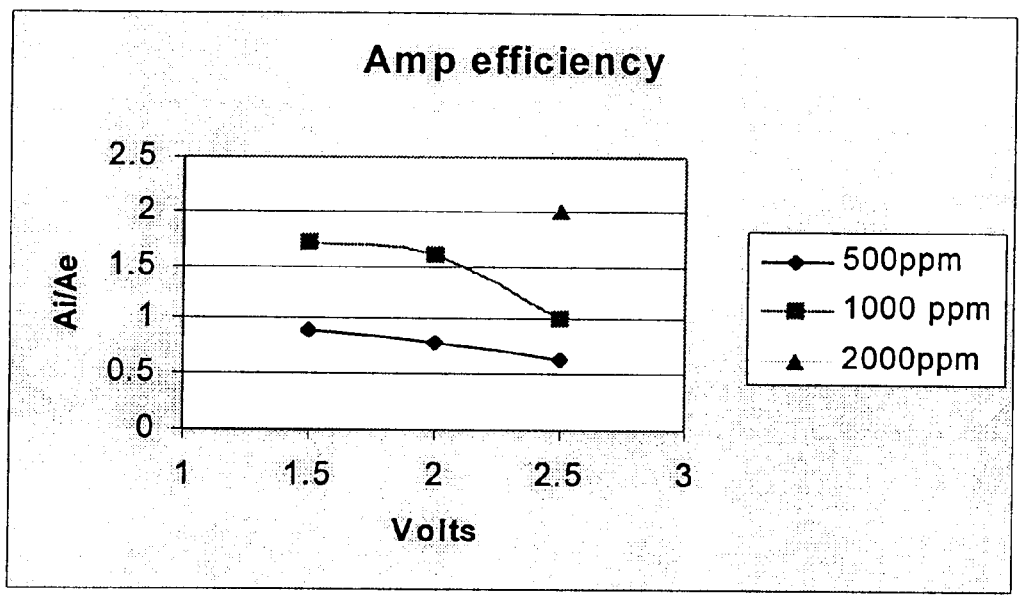
FIG. 3 is a graphical representation of the results of Experiment 2 of ionic amps versus voltage.

FIG. 3 shows the ratio of ionic amps to electronic amps versus voltage for the three concentrations used. Percent purification is recorded, along with electronic amperage and voltage as measured at the capacitor terminals. Ionic amps is calculated from the measured molar amount of salt purified. joules per coulomb needed to purify a given amount of ions is calculated from the amps and voltage measured at the capacitor terminals, combined with the amount of salt purified per unit time.

Experiment 3

Figure 5:
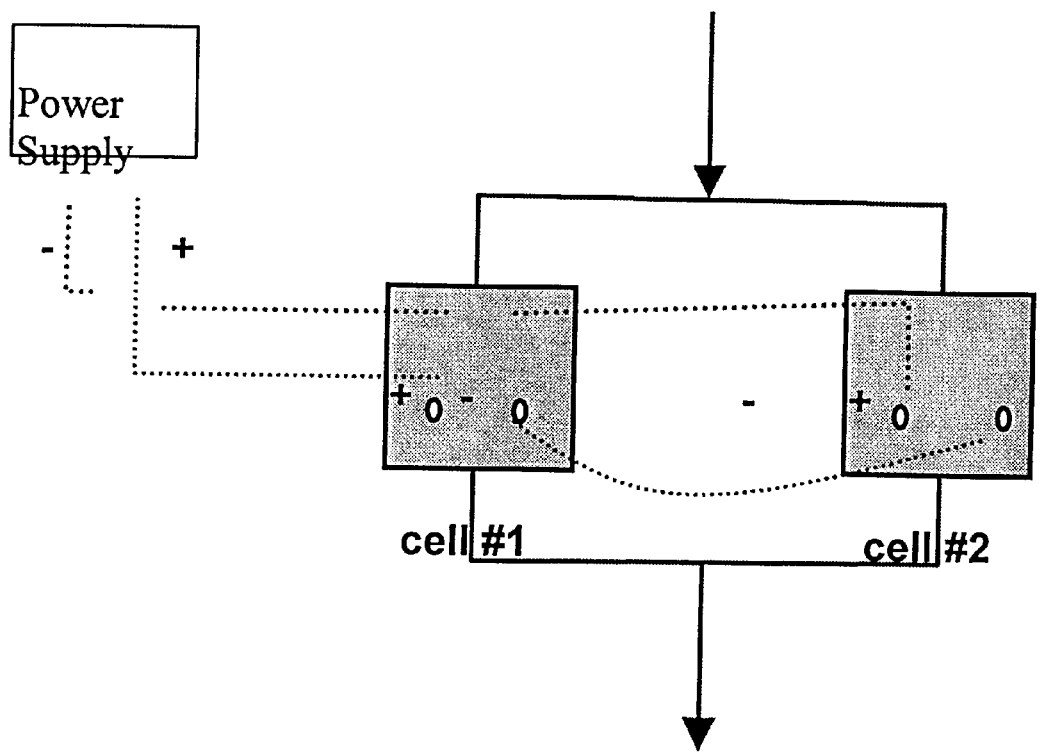
FIG. 5 is a schematic illustration of a flow-through capacitor connected in series with parallel flow, as in Experiment 3.
Figure 6:
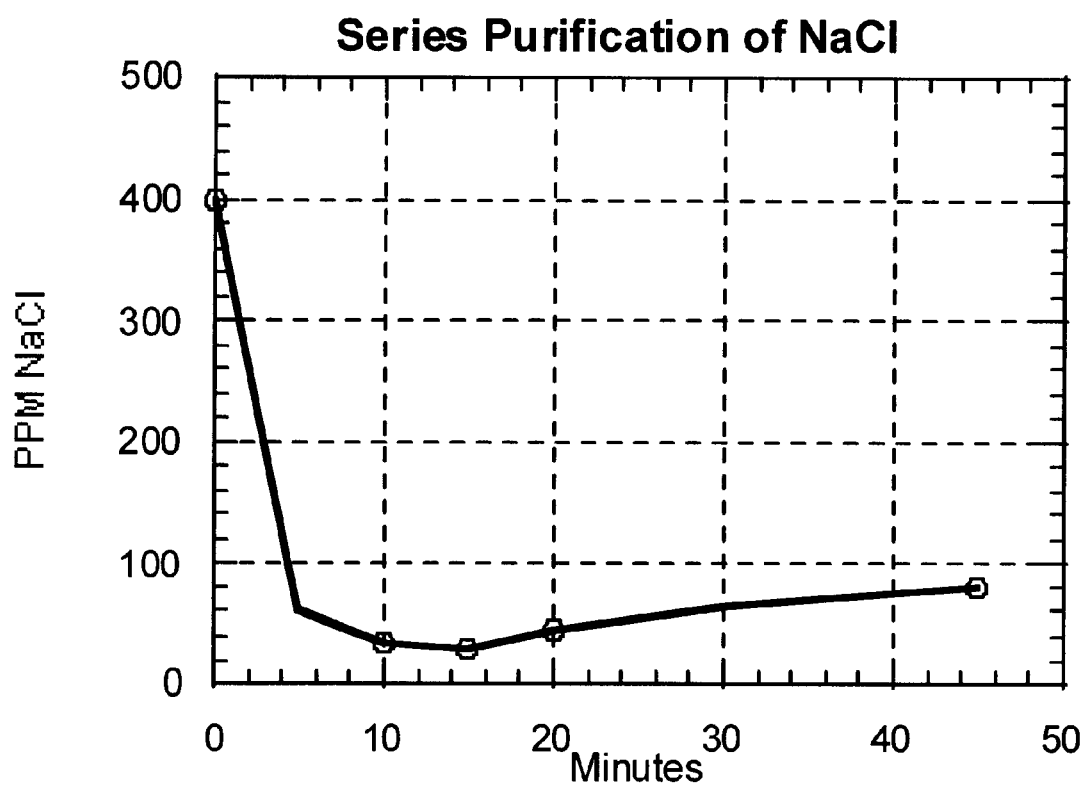
FIG. 6 and FIG. 7 are graphical representations of the results of Experiment 3 with the capacitor of FIG. 5.
Figure 7:
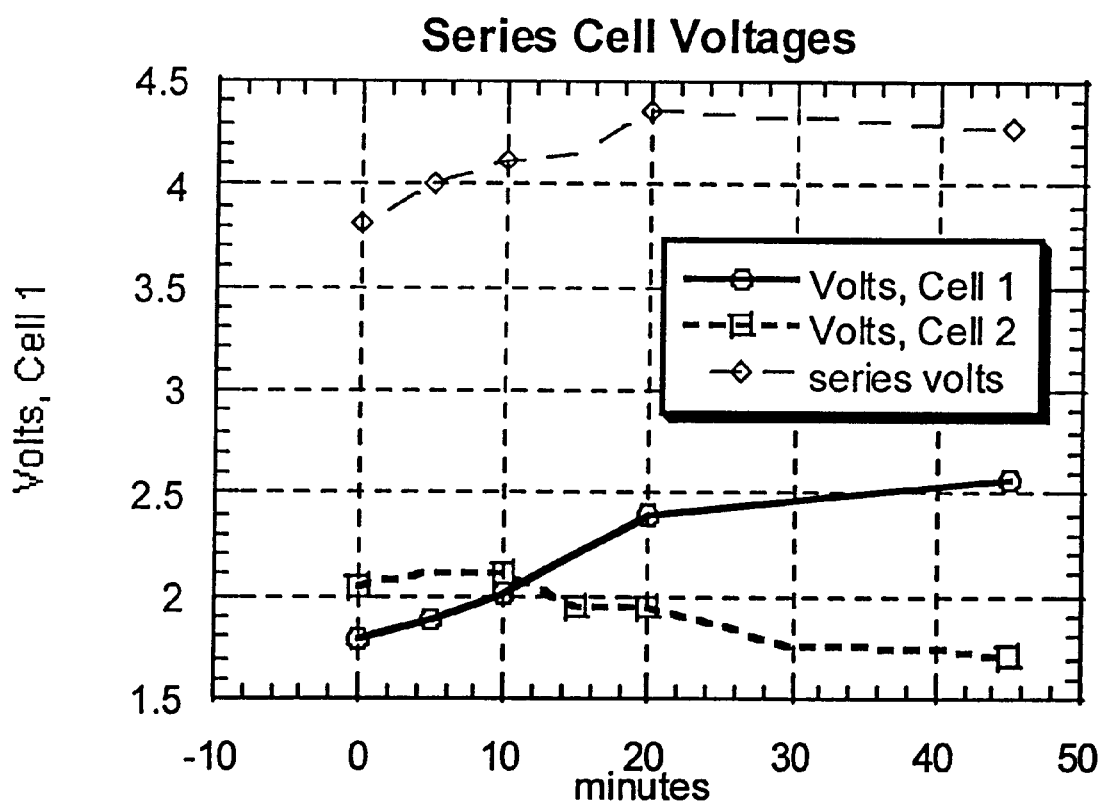

Two flow-through capacitors with 1328 grams of carbon cloth were connected electrically in series, but with parallel fluid flow, as in FIG. 5. This was run at a total flow rate of 1 GPM. The purified samples from the outlet were pooled and the conductivity was measured (see FIG. 6). Voltages at the terminals of the individual capacitors were measured (see FIG. 7).

A number of factors that impede development of energy storage capacitors can be an asset to flow-through capacitor design. This is due to the fact that the purpose of a flow-through capacitor is not to store energy, but to store charge. A capacitor is not a constant voltage device. Voltage builds up during the charging time. The energy required to store each charge increases as the voltage increases. Getting the last little bit of charge into it takes a lot more energy than the first little bit. Anyone who has pumped up a tire or pushed on a spring has experienced a similar phenomenon. This can be used to the advantage when using a capacitor to store charge. If a capacitor is charged and discharged ten times at $1/10$ of a volt, it will store exactly as much charge as if the capacitor had been charged once up to one volt. However, the energy required to store that charge, or joules/coulomb, will be 1/n times less, where n is the number of charge cycles. The voltage per cycle is V/n. It so happens that the definition of a volt is joules/coulomb. However, this is applied to ionic charge carriers instead of electronic ones. It refers to an "ionic volt".

Figure 8:
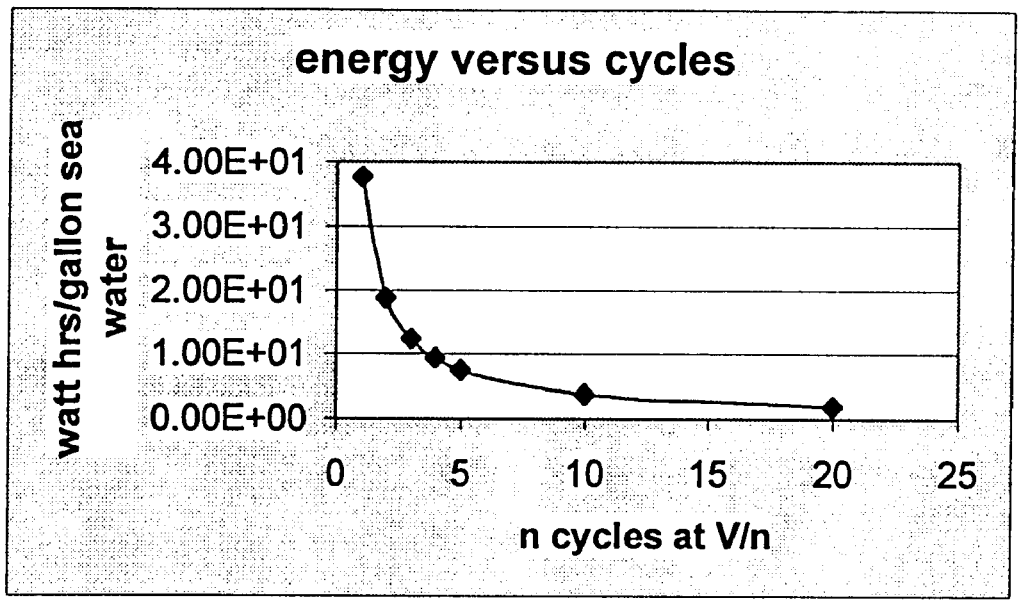
FIG. 8 is a graphical representation of energy versus number of cycles.

FIG. 8 shows that energy required to purify a given quantity of seawater tapers off to zero as the number of cycles is increased.

Lowered energy with increasing cycle numbers is strictly a consequence of purification at low voltage, according to equation 11. Purification at a large number of cycles merely means that the average voltage never climbs very high. This is due to the fact that the capacitor is not a constant voltage device. Therefore, with more and shorter cycles, the lower the averaged voltage and therefore energy of purification.

Figure 4:
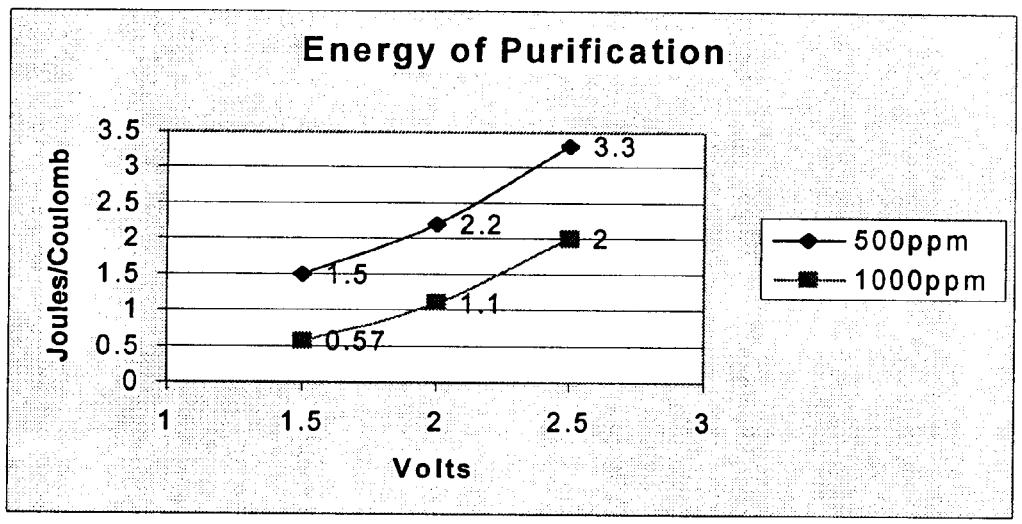
FIG. 4 is a graphical representation of the results of Experiment 2 of ionic volts versus volts.

Experimental verification of this concept may be seen in FIGS. 2 and 4. FIG. 2 shows that it is possible to purify a given amount of solution to better than 90% at either 0.5, 1, 1.5, or 2 volts. This experiment was run at constant flow rate while volts were increased in this stepwise fashion. In between charge cycles the capacitors were shorted through a load, thereby discharging their adsorbed ions. The regeneration peaks get progressively larger as a consequence of equations 9 or A2. In a fast cycle scheme it does not matter how much charge the capacitor can store at one time, because the purified water from the n cycles is collected and pooled together.

FIG. 3 demonstrates that the amount of energy needed by the commercial carbon cloth flow-through capacitor to purify a given amount of ions, or joules/coulomb (ionic volts) decreases with electronic voltage applied. The 1000 ppm NaCL solution at the relatively high voltage of 1.5 volts experimentally demonstrates 0.57 joules per coulomb. A 200 GPM reverse osmosis (RO) desalination unit sold by the military supplier Village Marine, and advertised as the "Energy Miser" (a trademark of Village Marine) requires 1.7 joules per coulomb. The 0.57 joules per coulomb figure for the carbon cloth flow-through capacitor could probably be halved at no additional cost in weight or equipment simply by dumping the charge of a charged capacitor into a discharged one. That would be 0.28 joules/coulomb, or 40% better than the best large-scale commercial RO systems. Small RO systems perform more poorly due to flow rate and pump limitations.

Interestingly, FIG. 3 shows greater energy efficiency with increasing concentration. One might expect less energy efficiency, due to greater solution resistance which slows the capacitor down so that average voltages, and therefore energy, is lower. However, the high electrode resistances of a carbon cloth capacitor would be the limiting resistance. Therefore, this is due to something else. It is probably a consequence predicted by Debye Huckel limiting law. Simply put, ions are surrounded by counter ions. As concentration goes up, ions and their associated counter ions are closer together. Therefore, the ions become less of a unit charge and more of a partial one with increasing concentration. This counter ion charge shielding would account for the experimental result that lower energy is required to purify a given unit of charge from a concentrated solution.

A hidden assumption in the technical analysis and equations 1–16 is that there is charge parity between electronic and ionic charge. Experiment 2 tests this assumption. FIG. 3 graphs the ratio of "Ionic Amps" over electronic amps versus voltage, in order to get amp efficiency. Ionic amps is the measured amount of ions purified converted into coulombs per second by use of Faraday's constant $9.648 \times 10^4$ coulombs/mole. This shows that the amp efficiency ratio is generally better than 1 and improves with concentration. This again is probably due to counter ion charge shielding. It is also almost like a free lunch.

An important factor that prevents the use of flow-through capacitors for high concentration solutions is due to the large amp requirement of a concentrated solution. To avoid the use of heavy, high amp circuits, it will be necessary to put flow-through capacitors in series in order to use ordinary higher voltage, lower amp power. Equation 15 shows that one can hook up flow-through capacitors in series and calculate charge absorbed as the sum of each individual capacitor times the individual cell voltages, rather than as the much smaller multiple of the series capacitance and series voltage used to calculate electronic charge. This is a major theoretical difference between flow-through and electronic capacitors.

Figure 9:
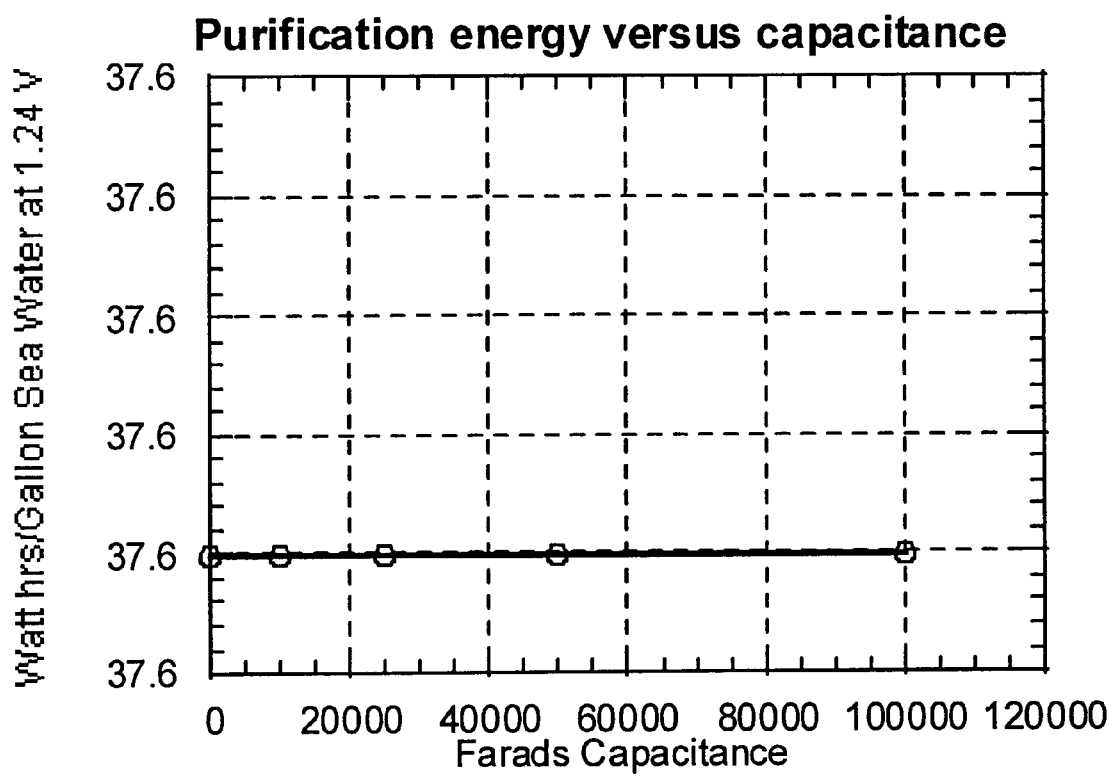
FIG. 9 is a graphical representation of purification energy of seawater versus capacitance.

Purification energy is dependent upon keeping cell voltages low during the charge cycle, as conveniently made possible by the 1/n charge cycle scheme shown in equation 11. Purification energy accordingly is not dependent upon capacitance. FIG. 9 graphs purification energy of seawater at 1.24 volts in watt hrs per gallon versus capacitance. This energy does not change and is only a function of volts and solution concentration.

Figure 10:
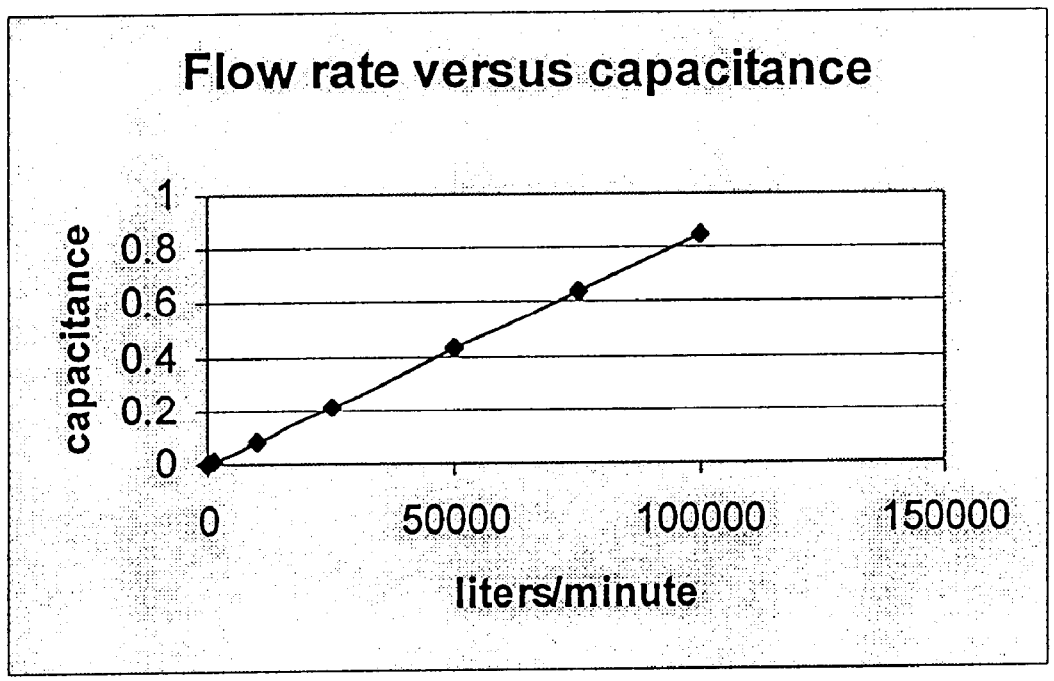
FIG. 10 is a graphical representation of flow rate versus capacitance for seawater.

Capacitance and resistance are crucially important for flow rate. However, flow rate per given amount of electrode material is critical for weight. Flow rate is equivalent to power in an electronic capacitor. FIG. 10 shows flow rate versus capacitance for seawater.

Figure 11:
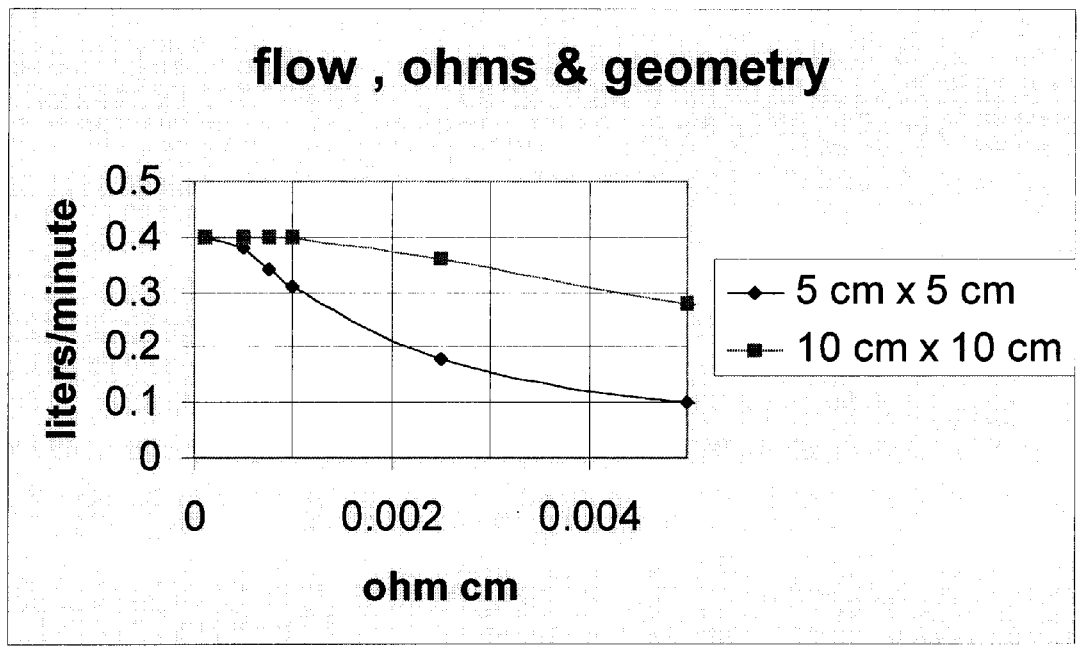
FIG. 11 is a graphical representation of flow rate as a function of resistance of ohms cm electrode material of a flow-through capacitor.

FIG. 11 shows flow rate as a function of ohms cm of electrode material.

The 5 cm square electrode shapes show faster flow rate, due to the lower resistive path of these shorter electrodes. More square electrodes can be bundled in parallel to manufacture the same sized capacitor. Alternatively, leads could have been connected on both ends of the longer, 10 cm electrodes. Ideally, the electrodes should be sized so that the resistive paths are short, in order to provide a flow-through capacitor with a series resistance of 100 milliohms or less.
Feasibility, Znergy Efficient, Light Weight Desalination with the Flow-Through Capacitor The present technology utilizes carbon cloth. The cloth resistance is 0.9 ohms-cm., and it is relatively thick at 0.05 cm. There is also a resistive junction between this cloth and the graphite foil current collector that is probably even worse. In short, this material is energy inefficient due to its high resistance of over 100 ohm cm. It is desirable to use electrode materials with resistance of less than 100 ohm cm (see FIG. 11). This indicates that an electrode with ohm cm needed to meet the flow rate specifications for an extremely energy efficient device will require an electrode in the milliohm range. Generally, it is desirable that electrode materials be 100 milliohms cm or less. However, if high flow rate is not required, the flow-through capacitor of the invention can achieve energy efficiency merely by maintaining low average capacitor voltages under 1 volt. Highly conductive electrodes include, for example, a Swiss group whose product is described on:

http://wwwl.psi.ch/www_f5-hn/Electrochemistry/SupCaD/Poster$_{13}$ PPM.html (hereby incorporated by reference).

Nanotubes are another highly-conductive electrode material, since they are graphite in nature. Graphite samples measured are in the 0.8 milliohm range. Nanotubes should be at most 25 nanometers wide and at least 50 microns tall in order to achieve surface areas of 100 square meters per gram. This surface area is far smaller than activated carbons, but unlike activated carbon, the surface areas should all be accessible. 100 square meters per gram is estimated to be the surface area needed in order to provide at least 50 Farads per gram, by analogy to data from know materials whose pore structure is also open, such as the Pinnacle Ru Ta mixed oxide material. Other monolithic high surface area electrodes are known. Ru Ta mixed oxide electrodes may be used in the capacitor.

Anti-microbial Function of the Flow-Through Capacitor

Furthermore, commercial flow-through capacitors in the field have not been observed to form bioslime. This is unlike the situation with activated carbon filters and RO membranes, which are well known to slime up. The flow-through capacitor can first concentrate the needed pre-cursor ions from the environment prior to converting them into mixed oxidants by an occasional voltage pulse.

What is claimed is:

1. A flow-through capacitor system for the purification of a solution in an energy efficient manner by power charging and discharging cycles, which flow-through capacitor comprises one or a plurality of flow-through capacitor cells composed of a conductive electrode material and which system includes an electrical power source, each of the capacitor cells arranged and constructed for discharging in any one power charging cycle prior to the cell voltage exceeding 1.5 volts.

2. The system of claim 1 which comprises an electrode material with an internal resistance of about 100 milliohms or less and a capacitance of about 1000 Farads, or more.

3. The system of claim 1 whereby the flow-through capacitor comprises a plurality of cells and wherein the cells of the flow-through capacitor are successively charged by the power supply through n cycles where n is any integer and where the average voltage of the cells of the flow-through capacitor does not exceed about 1 volt.

4. The system of claim 1 wherein the electrode material comprises a carbon cloth or graphite.

5. The system of claim 1 wherein the flow-through capacitor has an energy use of about 1 joules per coulumb of ions purified, or less.

6. The system of claim 1 which includes a source of seawater to be purified and the capacitor purifying the seawater at about 40 watt-hours per gallon of seawater or less.

7. The system of claim 1 wherein the system comprises a plurality of flow-through capacitor cells electrically connected in a series to the power source and connected parallel in fluid flow of the solution.

8. The system of claim 1 wherein the system has an amp efficiency of about one or more.

9. The system of claim 1 where the flow-through capacitor of the system is successively charged from the power source and discharged in a time period of about 10 minutes, or less.

10. The system of claim 9 wherein the system includes means to pool the purified solution during successive power charging cycles.

11. A flow-through capacitor system for the purification of a solution in an energy efficient manner by power charging and discharging cycles, which flow-through capacitor comprises one or a plurality of flow-through capacitor cells composed of a conductive electrode material and which system includes an electrical power source, each of the capacitor cells arranged and constructed for discharging in any one power charging cycle prior to the cell voltage exceeding 1.5 volts; wherein such system comprises an electrode material with an internal resistance of about 100 milliohms or less and a capacitance of about 1000 Farads, or more; and which system comprises a plurality of flow-through capacitor cells electrically connected in series to the power source and connected parallel in fluid flow of the solution, and which flow-through capacitor comprises a plurality of cells wherein the cells of the flow-through capacitor are successively charged by the power supply through n cycles where n is any integer and where the average voltage of the cells of the flow-through capacitor does not exceed about 1 volt.

12. An energy efficient flow-through capacitor for the purification of a solution, which flow-through capacitor comprises a plurality of electrical power connected cells of conductive electrode material, each cell having an internal resistance of about 100 milliohms, or less, and a capacitance of about 1000 Farads, or more, the flow-through capacitor characterized by the collection of purified solution and the discharging of the cell prior to the cell voltage exceeding 1.5 volts.

13. The capacitor of claim 12 wherein the individual cells are electrically connected in series and flow connected in parallel.

14. The capacitor of claim 12 wherein the electrode material comprises carbon cloth or a graphite.

15. A method of purifying a solution by a flow-through capacitor having a plurality of individual cells composed of a conductive electrode material, which method comprises:

a) introducing a solution to be purified into the capacitor; and b) collecting purified solution from the capacitor prior to the individual cell voltage reaching about 1.5 volts.

16. The method of claim 15 wherein the solution to be purified comprises seawater.

17. The method of claim 15 which includes electrically connecting the individual cells in series and flow connecting the cells in parallel.

18. The method of claim 15 which comprises purifying a seawater solution at an energy of about 40 watt hours per gallon.

19. The method of claim 15 charging the capacitor and discharging the capacitor about every 10 minutes, or less, and pooling the purified solution of successive charge-discharge cycles together.

20. The method of claim 15 wherein the electrode material of each cell has an internal electrical resistance of about 100 milliohms, or less.

* * * * *